United States Patent Office 3,512,463
Patented May 19, 1970

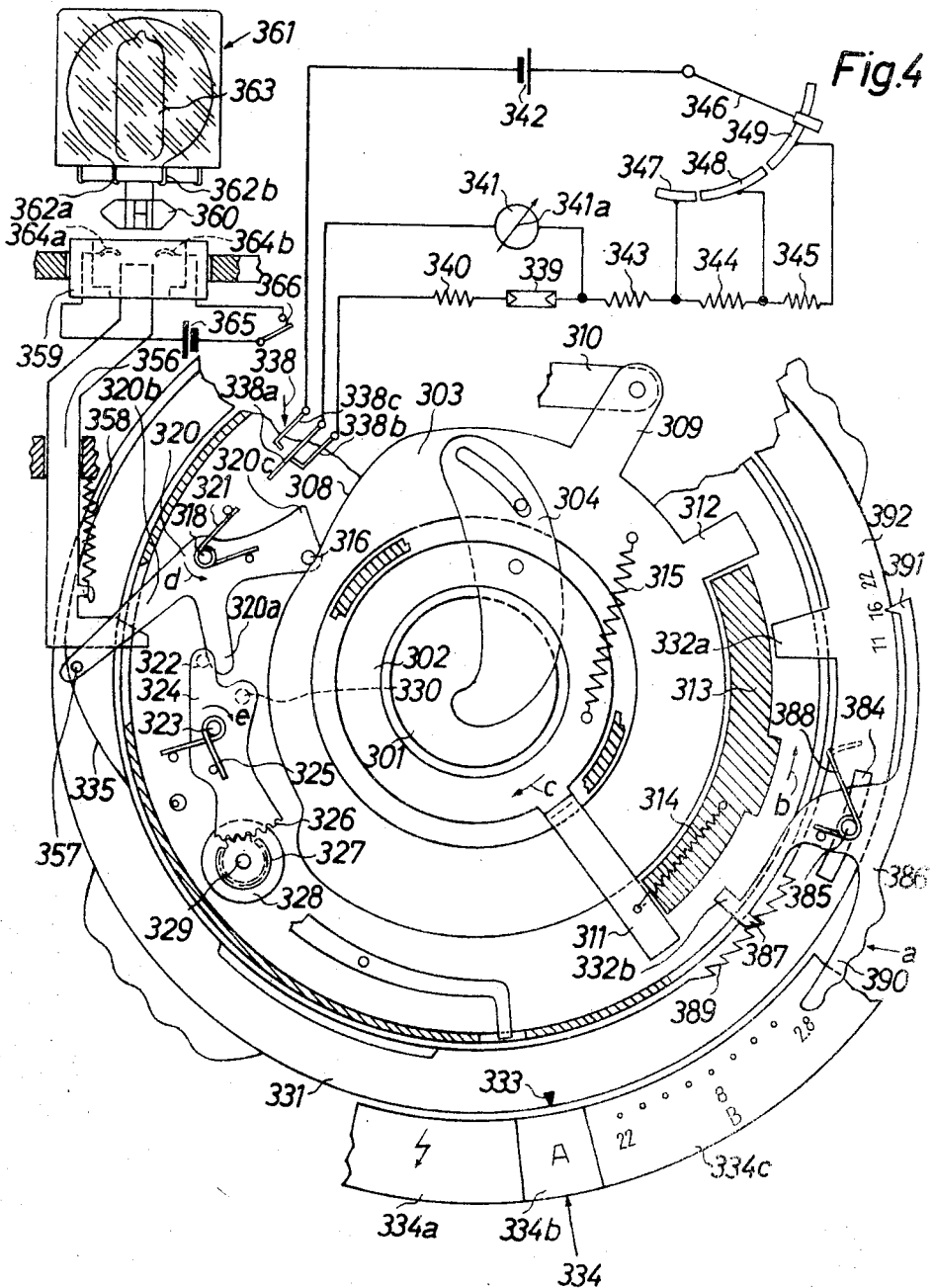

3,512,463
CAMERA WITH BUILT-IN EXPOSURE METER FOR DAYLIGHT AND FLASH PHOTOGRAPHY
Gerd Kiper, Unterhaching, Germany, assignor to Agfa-Gevaert Aktiengesellschaft, Leverkusen, Germany
Filed July 18, 1967, Ser. No. 654,098
Claims priority, application Germany, July 28, 1966, A 53,121; Jan. 12, 1967, A 54,594, A 54,595
Int. Cl. G03b 7/12, 7/16
U.S. Cl. 95—10                                                  37 Claims

ABSTRACT OF THE DISCLOSURE

A manually actuatable selector can adjust the diaphragm of a camera in accordance with the guide number or another characteristic of a flash unit or another source of artificial light. The selector then displaces one of two relatively movable rings which control the aperture size. The other ring can be adjusted as a function of the intensity of scene light, as a function of the distance from the subject, or by the selector when the operator wishes to determine the aperture size by hand.

Cross-reference to related application

The camera of the present invention constitutes a further development of cameras disclosed in the copending application Ser. No. 464,511, filed by Gerd Kiper et al. on June 16, 1965, and assigned to the same assignee.

Background of the invention

The present invention relates to photographic cameras, and more particularly to improvements in cameras with built-in automatic exposure meters. Still more particularly, the invention relates to improvements in cameras which can be used for outdoor or indoor photography in daylight as well as for outdoor or indoor photography in artificial light furnished by one or more flash bulbs or by an electronic flash unit.

The aforementioned copending application Ser. No. 464,511 discloses a camera wherein a selector can determine the size of the aperture for operation with flash. Such size is determined by resorting to calculations necessitating the knowledge of the guide number and the distance from the subject. Furthermore, the selector is not intended to be adjusted in automatic response to attachment or in response to placing in operative position of a separable or built-in flash unit or an analogous source of artificial light.

Summary of the invention

It is an object of the present invention to provide a camera which has a built-in automatic exposure meter with means for permitting the use of such camera with two or more different sources of artificial illumination.

Another object of the invention is to provide a camera of the just outlined character wherein a source of artificial illumination can be permanently installed in or on the body of the camera.

A further object of the invention is to provide a camera having a built-in source of artificial light wherein the operator need not make any adjustments, other than placing the source into operative position, in order to change from making exposures in daylight to making exposures with light furnished by the built-in source.

An additional object of the invention is to provide a camera for use with several sources of artificial illumination wherein an appropriate exposure time is set in automatic response to adjustment of camera for operation in artificial light.

Briefly outlined, one feature of my invention resides in a combination which can be embodied in cameras with built-in or detachable sources of artificial light. The combination comprises a diaphragm including two preferably ring-shaped setting members movable with reference to each other to provide a range of aperture sizes by changing the position of one or more diaphragm blades, an exposure meter which includes an output member (e.g., the needle of a moving coil instrument) movable to a plurality of positions, light-sensitive means (including a cell or a resistor and a source of electrical energy) connectable with the output member to determine the latter's position as a function of the intensity of scene light when the camera is used to make exposures in daylight or in artificial light other than that furnished by the built-in or detachable source of light, variable resistor means connectable with the output member to determine the latter's position as a function of the distance between the camera and the subject, an assembly (preferably including a tracking or scanning mechanism which detects the position of the output member in response to actuation of the shutter release trigger) for changing the position of one of the setting members in the diaphragm as a function of the position of the output member, and switchover means actuatable to selectively connect the output member with the light-sensitive means or with the variable resistor means (the variable resistor means will be connected with the output member only when the camera is set to make an exposure in artificial light), and manually actuatable selector means for moving the other setting member of the diaphragm to a position which is a function of a characteristic (guide number or light value) of a source of artificial light. The selector means preferably comprises an annulus which is turnable with reference to a fixed scale and comprises a motion transmitting portion which can engage projections provided on the setting members. When the motion transmitting portion of the selector means engages and displaces the projection of the one setting member, such displacement can be used to effect manual determination of the aperture size. The selector means can also actuate the switchover means and may be provided with operating means for adjusting the shutter to furnish an appropriate exposure time when the camera is set to make exposures in light provided by the source whose characteristic corresponds to the position of the other setting member.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

Brief description of the drawing

FIG. 4 is a fragmentary diagrammatic view of a camera which constitutes a modification of the camera shown in FIG. 3.

Description of the preferred embodiments

Figure 1:
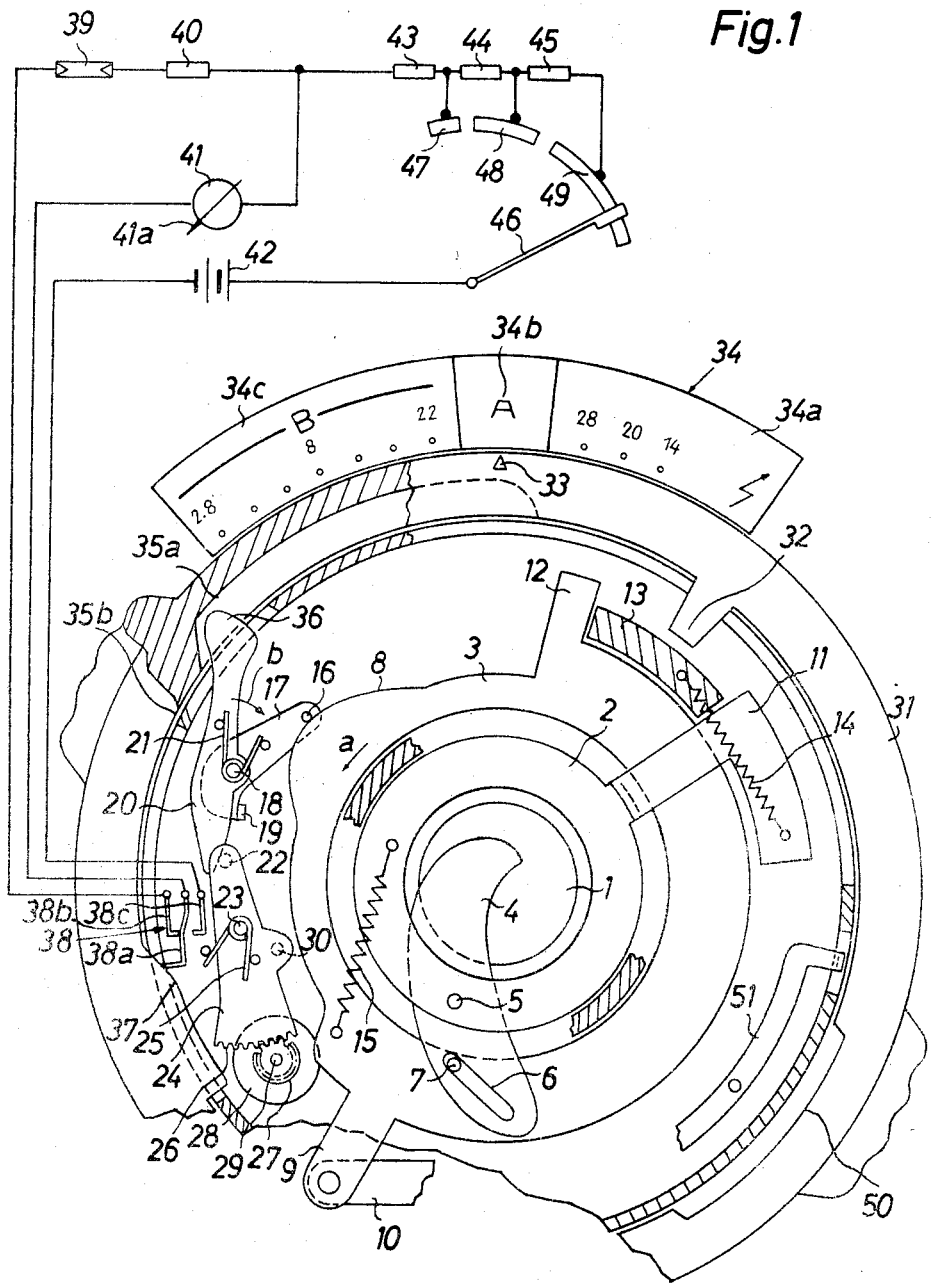
FIG. 1 is a fragmentary diagrammatic front elevational view of a camera which embodies one form of my invention, a portion of the selector means being shown in section.

Referring first to FIG. 1, there is shown a portion of a photographic camera including an objective lens 1 and a diaphragm comprising two movable setting members 2, 3 (hereinafter called rings for short) which can turn about the optical axis, and a set of diaphragm blades 4 (only one shown). Each blade 4 has a pivot pin 5 which is turnable in a hole of the inner ring 2 and a slot 6 which receives a motion transmitting pin 7 carried by the outer ring 3. It will be seen that the size of the aperture defined by the blades 4 will change only when the inner ring 2 turns with reference to the outer ring 3, or vice versa, i.e., the rings can turn in unison without changing the size of the aperture. These rings can furnish a whole range of aperture sizes.

The periphery of the outer ring 3 is provided with a cam 8 which can determine the exposure time, and with a radially outwardly extending projection or arm 9 which is coupled to one member 10 of a link training constituting a mechanical connecting between the outer ring 3 and the tracking or scanning mechanism for the output member or needle 41a of an automatic exposure meter including a moving coil instrument 41. The exposure meter and its tracking or scanning mechanism for the output member 41a of the instrument 41 may be constructed and assembled in a manner as disclosed, for example, in German Pat. No. 1,177,920. The link train including the coupling member 10 and the tracking or scanning mechanism which determines the position of the output member 41a together form an assembly which can change the position of the outer ring 3 as a function of the position of the output member 41a.

The rings 2, 3 are respectively provided with radially outwardly extending motion receiving projections or lugs 11, 12 each of which is biased against a stationary stop 13 of the camera body. A first helical return spring 14 is connected between the ring 2 and stop 13 to urge the lug 11 against the stop, and a second helical return spring 15 connects the rings 2, 3 in a sense to urge the lug 12 against the stop 13. In the illustrated embodiment, the springs 14, 15 respectively bias the rings 2, 3 in a counter-clockwise and in a clockwise direction.

The cam 8 on the periphery of the ring 3 is tracked by a pin-shaped follower 16 which is provided on one arm of a control lever 17 mounted on a shaft 18 and biased by a torsion spring 21 so as to urge the following 16 into engagement with the cam 8. The other arm of the control lever 17 has a bent-over portion or tongue 19 which can turn an adjusting lever 20, the latter being turnable on the aforementioned shaft 18 for the control lever 17. The torsion spring 21 operates between the levers 17, 20 and is coiled around the shaft 18 so that the lever 20 tends to turn in a counter-clockwise direction and to bear against an arresting post 22 provide on one arm of a retard lever 24 which is turnable on a shaft 23 and is biased by a torsion spring 25 tending to rotate it in a counterclockwise direction. The retard lever 24 has a toothed portion or segment 26 which meshes with a pinion 27 mounted on a shaft 29 and connected with a flywheel or mass 28. A further post 30 of the retard lever 24 can extend into the path of movement of a driving ring for the shutter blades (not shown). The parts 24, 27, 28 to gether constitute a retard mechanism for the shutter whose construction is known and by itself forms no part of the instant invention. The parts 16–30 together form an adjustable shutter regulating means which is operative to furnish a plurality of exposure times.

The camera further comprises an annular selector 31 which is concentric with the objective lens 1 and is turnable about the optical axis. The selector 31 comprises a radially inwardly extending motion transmitting portion or leg 32 which extends into the space between the lugs 11, 12 of the setting rings 2, 3 and can move either of these lugs away from abutment with the stop 13. An index or marker 33 on the selector 31 can be placed into registry with one of three sections 34a, 34 b, 34c of a fixed scale 34 which is secured to the camera body. The section 34a of the scale 34 carries a thunderbolt symbol to indicate that the camera is set for operation in artificial light when the index 33 of the selector 31 is placed into registry with a graduation of the scale section 34a. These graduations can indicate guide numbers or light values for different sources of artifical illumination. For example, the light values can correspond to guide numbers of such sources for a film having a speed of 18 (DIN Exposure Index).

The median section 34b of the scale 34 carries a single symbol A which indicates that the camera is set for automatic determination of exposure values (exposure time and the size of the diaphragm aperture) when the symbol A registers with the index 33. The scale section 34c carries a symbol B which indicates that the exposure values are determined by hand when the index 33 registers with one of the graduations on the section 34c. These graduations indicate different sizes of the diaphragm aperture.

The selector 31 further comprises a composition operating cam having a first portion 35a and a second portion 35b. The portion 35b of this operating cam can be tracked by a follower or arm 36 provided on the adjusting lever 20. Still further, the selector 31 comprises an actuating portion or trip 37 which can change the position of a movable median contact 38a forming part of a switchover device here shown as a two-way electric switch 38. The latter comprises two fixed contacts 38b, 38c. When the movable contact 38a engages the fixed contact 38b (this condition of the two-way switch 38 is shown in FIG. 1), the angular position of the selector 31 corresponds to setting of the camera for operation in daylight with automatic determination of exposure values, i.e., the index 33 of the selector 31 then registers with the symbol A on the median scale section 34b. The switch 38 then connects the moving coil instrument 41 in series with a light-sensitive receiver 39 (e.g., a cadmium sulphide cell) and a fixed resistor 40.

If the movable contact 38a of the switch 38 engages with the fixed contact 38c, the output member 41a of the moving coil instrument 41 is connected in circuit with a battery 42 or another suitable source of electrical energy and with a variable resistor resistor including three fixed resistors 43, 44, 45 and a slider 46 of current conducting material. The number of resistors which are actually connected in the circuit of the moving coil instrument 41 during operation with flash will depend on the angular position of the slider 46 which is rigid with or is suitably coupled to the focussing means of the camera. The slider 46 can engage with one of three arcuate conductors 47, 48, 49 to respectively connect the resistor 43, the resistors 43–44 or the resistors 3–45 into the circuit of the moving coil instrument 41. When the movable contact 38a of the switch 38 engages with the fixed contact 38c, the index 33 of the selector 31 registers with one of the graduations on the scale section 34a.

The selector 31 is further provided with a recess or cutout 50 which can receive one end of a lever 51 when the selector's index 33 registers with a graduation on the scale section 34c. The motion transmitting leg 32 then engages the lug 12 on the ring (3) which is adjustable as a function of the angular position of the output member 41a whereby the ring 3 determines the aperture size in accordance with the user's own selection.

The operation is as follows:

When the selector 31 assumes the angular position which is shown in FIG. 1, its index 33 registers with the symbol A on the central scale section 34b so that the camera is set for automatic determination of exposure time and aperture size. The movable contact 38a of the switch 38 tends to engage with the fixed contact 38b, and the actuating member or trip 37 of the selector 31 permits the contact 38a to assume such position when the index 33 registers with the symbol A. The output member 41a of the moving coil instrument 41 then assumes an angular position which is a function of the intensity of scene light impinging upon the light-sensitive receiver 39 which is connected in circuit with the instrument 41, fixed resistor 40 and two-way switch 38. If the operator thereupon depresses the shutter release trigger (not shown), the aforementioned scanning or tracking mechanism detects the angular position of the output member 41a and the link train including the coupling member 10 changes the angular position of the outer ring 3 so that the latter's position is also a function of the intensity of scene light. Depending on the intensity of scene light, the coupling member 10 moves the outer ring 3 through a greater or smaller angle in a counterclockwise direction indicated in FIG. 1 by an arrow a so that the lug 12 of the outer ring moves away from the fixed stop 13. The return spring 14 continues to bias the lug 11 of the inner ring 2 against the stop 13 so that the outer ring 3 moves with reference to the inner ring and changes the size of the aperture which is defined by the blades 4. At the same time, the cam 8 of the outer ring 3 allows the torsion spring 21 to change the angular position of the control lever 17 because the latter's follower 16 tracks the face of the cam 8. Such angular displacement of the control lever 17 is shared by the adjusting lever 20 which turns in a clockwise direction (arrow b). The torsion spring 25 is permitted to dissipate energy and to turn the retard lever 24 in a counterclockwise direction because the post 22 of the lever 24 continues to bear against the adjusting lever 20. Thus, the adjusting lever 20 permits for such setting of the retard mechanism 24, 27, 28 that the exposure time (determined by the post 30) will be a function of the intensity of scene light. The exposure is made when the release trigger opens the shutter.

If the user thereupon decides to make an exposure in artificial light, the selector 31 is turned in a clockwise direction to place the index 33 into registry with a graduation on the scale section 34a. This causes the trip 37 of the selector 31 to move the median contact 38a of the switch 38 into engagement with the fixed contact 38c. The cam portion 35b of the operating cam on the selector 31 engages the follower 36 which turns the adjusting lever 20 in a clockwise direction (arrow b) whereby the lower arm of the adjusting lever moves away from the tongue 19 of the control lever 17 and causes the torsion spring 21 to store energy. The spring 25 causes the retard lever 24 to turn in a counterclockwise direction and the retard mechanism 24, 27, 28 is set to furnish an exposure time which is appropriate for the exposure with a source of artificial light.

The motion transmitting leg 32 of the selector 31 engages the lug 1 of the inner ring 2 while the index 33 travels from registry with the symbol A into registry with a graduation of the scale section 34a whereby the inner ring turns in a clockwise direction and causes the return spring 14 to store energy. Since the inner ring 2 turns with reference to the outer ring 3, the angular position of the blades 4 changes and these blades effect a preliminary setting of the aperture size. The operator thereupon manipulates the focussing means of the camera to select the proper focal distance. Such manipulation causes angular displacement of the conductor or slider 46 which connects one pole of the energy source 42 with one, two or all three fixed resistors 43–45. Thus, the output member 41a of the moving coil instrument 41 will assume an angular position which is a function of the distance from the subject. In the final step, the operator depresses the shutter release trigger whereby the aforementioned tracking or scanning mechanism detects the angular position of the output member 41a and adjusts the angular position of the outer ring (arrow a) through the intermediary of the coupling member 10. Thus, the final setting of the aperture size is a function of the guide number or light value (angular position of the selector 31 with reference to the scale section 34a) and a function of the distance from the subject (angular position of the output member 41a is dependency on the angular position of the slider 46).

When the camera is used to make exposures in artificial light, the cam 8, follower 16 and control lever 17 cannot influence the exposure time because the tongue 19 of the control lever is then disengaged from the adjusting lever 20. In other words, the exposure time is determined by the adjusting lever 20 because the latter's follower 36 is engaged by the portion 35b of the operating cam on the selector 31.

If the operator thereupon decides to place the index 33 of the selector 31 into registry with a graduation of the scale section 34c, the recess or cutout 50 of the selector 31 moves into registry with the lever 51. At the same time, the motion transmitting leg 32 of the selector 31 engages the lug 12 and turns the outer ring 3 in a counterclockwise direction (arrow a). The inner ring 2 remains idle because its lug 11 continues to abut against the stop 13 so that the size of the aperture changes as a function of the extent of angular displacement of the index 33 to the left of and beyond the median scale section 34b. In order to insure that the aforementioned tracking or scanning mechanism cannot influence the size of the aperture when the index 33 of the selector 31 registers with a graduation of the scale section 34c, the camera is preferably provided with a master switch (not shown) which opens the circuit of the moving coil instrument 41 and allows the output member 41a to assume an angular position in which the tracking mechanism cannot change the angular position of the outer ring 3 so that the angular position of this outer ring will depend solely on the angular position of the motion transmitting leg 32 on the selector 31 whenever the latter's index 33 registers with a graduation of the scale section 34c. The master switch closes automatically when the index 33 moves into registry with the scale section 34a or 34b. Alternatively, the selector 31 can actuate a locking or blocking device which inactivates the tracking mechanism in response to movement of the index 33 into registry with the scale section 34c. Such locking or blocking device is disclosed in the aforementioned German Pat. No. 1,177,920.

In the structure of FIG. 1, the speed of the film which is used in the camera can be accounted for by utilizing an opaque mask which can be caused to overlie a larger or smaller portion of the light-sensitive element 39 when the camera is used in daylight. The position of the mask will not affect exposures in artificial light because the circuit of the light-sensitive receiver 39 is opened in automatic response to placing of the index 33 into registry with a graduation of the scale section 34a. In the event that the camera is provided with such a mask for the light-sensitive receiver 39, the graduations on the scale section 34a indicate various guide numbers. However, if the sensitivity of film which is used in the camera for exposures in daylight is accounted for by changing the angular position of the entire moving coil instrument 41 in a manner well known from the art of cameras with automatic exposure meters, such change in the angular position of the instrument 41 will also influence the exposures in artificial light. Therefore, the scale section 34a then carries graduations which indicate light values of sources of artificial light which are to be used for making exposures with artificial illumination of the subject.

It is clear that the camera of FIG. 1 can be modified in a number of ways without departing from the spirit of my invention. For example, the invention can be embodied in cameras wherein the exposure time remains unchanged, at least when the camera is set to make exposures in daylight with automatic selection of the aperture size. It is further immaterial whether or not the camera is provided with means for effecting manual determination of the exposure aperture (scale section 34c). Also, the receiver 39 can be replaced with a light-sensitive resistor in series with a battery or a like source of electrical energy. In such cameras, the battery is preferably installed in the conductor which connects the movable contact 38a of the switch 38 with the moving coil instrument 41.

An important advantage of the camera shown in FIG. 1 is that it can be used with different types of sources of artificial light, namely with two or more light sources which produce light of different intensity. This is achieved by the provision of the selector 31 which can change the angular position of the inner ring 2, i.e., of that ring which is not connected with the tracking mechanism (member 10). The portion 35b of the operating cam automatically determines an appropriate exposure time when the index 33 of the selector 31 registers with a graduation of the scale section 34a. The cam portion 35a allows for automatic determination of exposure time by means of the cam 8 when the camera is set to make exposures in daylight (scale section 34b) or with manual determination of the aperture size (scale section 34c).

Another important advantage of the structure shown in FIG. 1 is that the setting of camera for use with flash units or other sources of artificial illumination having different light values can be selected in a very simple way and that such setting does not necessitate separate adjustments of the electric circuit. This is important because the electric circuit of a camera for use in daylight as well as in artificial light is invariably more complicated than the circuit of a camera which is used exclusively in daylight, i.e., wherein the exposure meter is employed to determine one or more exposure values solely as a function of the intensity of scene light but not in dependency on focal distance and/or the characteristics of a flash unit or the like.

Figure 2:
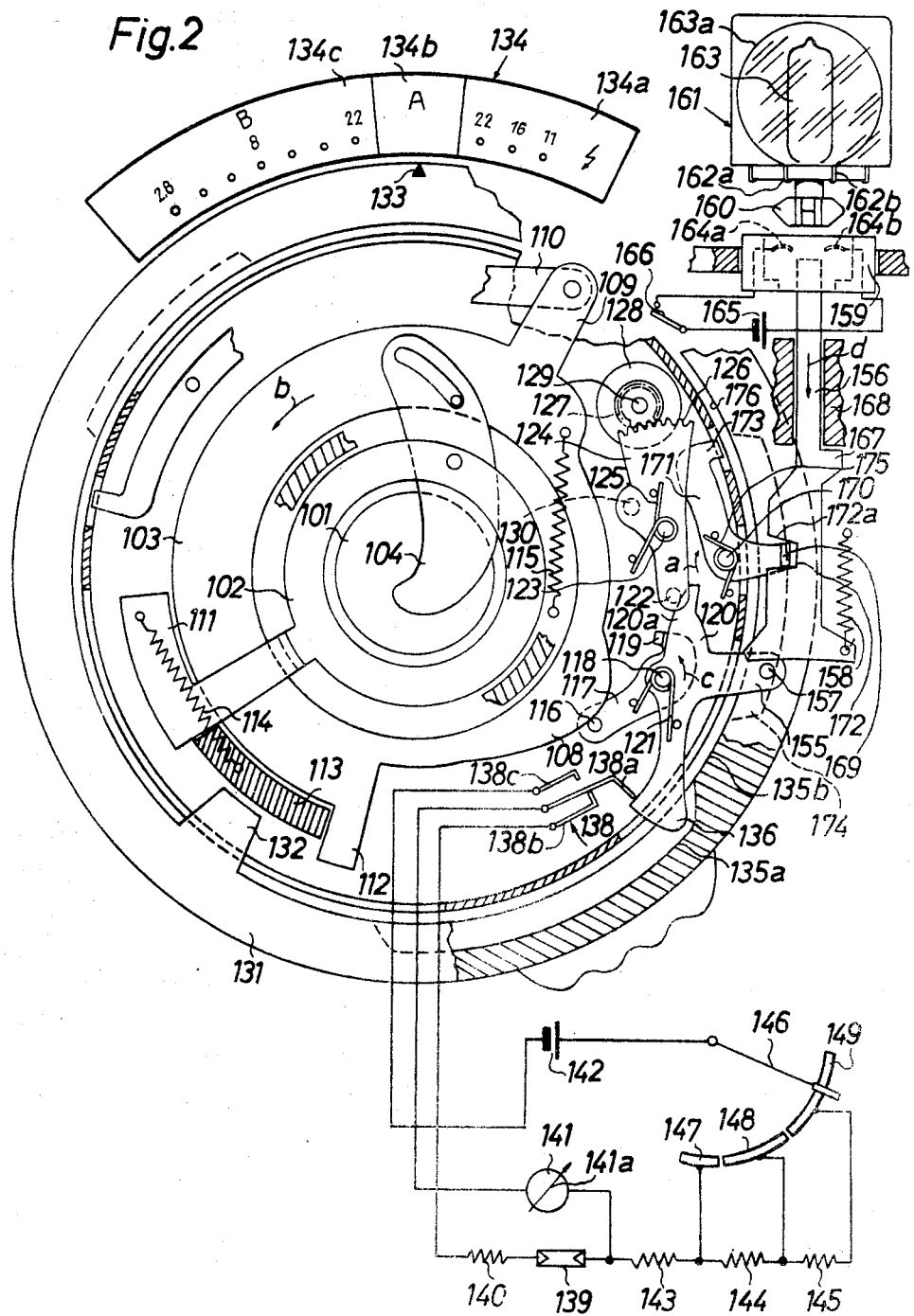
FIG. 2 is a similar fragmentary diagrammatic view of a second camera with a built-in source of artificial illumination.

FIG. 2 illustrates certain details of a second camera which is provided with a built-in flash unit and is constructed and assembled in such a way that placing of the built-in flash unit into operative position automatically results in requisite adjustment for operation in artificial light. In other words, and referring back to FIG. 1, movement of the built-in flash unit into operative position automatically sets the camera for operation with flash but such movement is not possible if the camera is set for operation with another source of artificial light.

Referring to FIG. 2 in detail, many parts shown in this illustration are analogous to or identical with the corresponding parts of the structure shown in FIG. 1, and such parts are denoted by similar numerals plus "100." Thus, the camera of FIG. 2 again comprises an objective lens 101 surrounded by the setting members or rings 102, 103 of a diaphragm which further includes blades 104 (only one shown) pivotably coupled to the inner ring 102 and provided with slots for pins carried by the outer ring 103.

The outer ring 103 is provided with a peripheral cam 108 and with an arm 109 which latter is coupled to the member 110 of a link train connecting the outer ring with the tracking or scanning mechanism for the output member 141a of a moving coil instrument 141. As stated before, such tracking mechanism may be constructed and assembled in a manner as disclosed in German Pat. No. 1,177,920.

The lugs 111, 112 of the rings 102, 103 flank a fixed stop 13 and these rings are respectively biased by return springs 114, 115 which tend to maintain the respective lugs in abutment with the stop 113. In its initial or starting position, the lug 111 of the inner ring 102 bears against the stop 113. The cam 108 of the outer ring 103 is tracked by the follower 116 of a control lever 117 which is turnable on a shaft 118 and is biased by a torsion spring 121 so that the latter maintains the follower 116 in engagement with the cam 108. The tongue 119 of the control lever 117 can transmit motion to the arm 120a of a three-armed adjusting lever 120 which is turnable on the shaft 118 and is also biased by the torsion spring 121. The arm 120a bears against a post 122 on the lower arm of a retard lever 124 which is turnable on a shaft 123 and is biased by a torsion spring 125. The past 130 of the retard lever 124 will influence the exposure time in the same way as described in connection with FIG. 1, and the upper part of the lever 124 carries a toothed segment 126 in mesh with a pinion 127 on a shaft 129. The pinion 127 is rigid with a mass or flywheel 128 and the parts 124, 127, 128 again form a retard mechanism for the blades of the non-illustrated shutter.

The manually operated selector 131 resembles an annulus and is turnable about the optical axis so that its index 133 may be placed into registry with the symbol A on the medium section 134b of a fixed scale 134, with a selected graduation on the right-hand section 134a which is provided with a thunderbolt symbol, or with a selected graduation on hte scale section 134c whose symbol B denotes manual determination of exposure values and whose graduations indicate different sizes of the aperture. The inwardly extending motion transmitting leg 132 of the selector 131 can displace the lug 111 or 112.

The graduations of the scale section 134a again indicate various guide numbers or light values of different sources of artificial light. For example, the light values can correspond to the guide numbers of such sources for a film speed of 18 (DIN Exposure Index). The portions 135a, 135b of the operating cam on the selector 131 perform the functions which were described in connection with FIG. 1, i.e., the cam portion 135a can accommodate with requisite clearance a follower or arm 136 of the adjusting lever 120 to permit for automatic or manual determination of exposure time, and the cam portion 135b will engage the follower 136 to insure that the exposure time is set in automatic response to placing of the index 133 into registry with a selected graduation of the scale section 134a. The projection 136 replaces the trip 37 of the selector 31 shown in FIG. 1 in that it can move the median contact 138a of a two-way electric switch 138 away from a first fixed contact 138b and into current-conducting engagement with a second fixed contact 138c. In the position shown in FIG. 2, the follower 136 of the arjusting lever 120 allows the movable contact 138a to engage with the fixed contact 138b because the index 133 registers with the symbol A of the median scale section 134b; therefore, the switch 138 connects the moving coil instrument 141 in series with a fixed resistor 140 and a light-sensitive receiver 139, e.g., a cadmium sulfide cell. The flash circuit is open. However, if the index 133 registers with a graduation of the scale section 134a, the follower 136 causes the movable contact 138a to engage with the fixed contact 138c whereby the switch 138 connects the moving coil instrument 141 in circuit with a battery 142, a current-conducting slider 146 whose angular position is determined by the focussing means of the camera, and with one, two or all three fixed resistors 143, 144, 145, depending upon whether the slider 146 engages the conductor 147, 148 or 149.

The adjusting lever 120 comprises a third arm 155 which is provided with a motion receiving pin 157 extending into the path of movement of a reciprocable actuating member or slide 156. This slide is reciprocable in a straight path defined by a fixed bearing 168 and its upper end portion normally extends into the interior of a rotary indexible socket 159 forming part of a built-in flash unit for the camera of FIG. 2. The slide 156 is permanently biased by a relatively strong helical return spring 158 so that its projection or lug 167 automatically abuts against the underside of the bearing 168 when the socket 159 is empty. The latter can receive the plug 160 of a multiple flash bulb holder 161, for example, a holder of the type known as "Flashcube" which has four flash bulbs 163 each located in front of a reflector 163a. The base of the holder 161 carries four pairs of terminals 162a, 162b, one pair for each flash bulb 163, and one pair of these terminals 162a, 162b automatically engages with resilient terminals 164a, 164b in or on the socket 159 when the plug 160 is properly inserted into the socket so that it moves the slide 156 downwardly (arrow d)

against the opposition of the return spring 158 to change the angular position of the adjusting lever 120 through the intermediary of the pin 157 and arm 155. The terminals 164a, 164b of the socket will be engaged by the terminals 162a, 162b of that flash bulb 163 which faces the subject, i.e., which is ready to be fired in response to actuation of the shutter release trigger (not shown). The flash circuit of the built-in flash unit further comprises at least one source 165 of electrical energy and a synchronizing switch 166 which is closed when the shutter opens in a manner well known from the art of cameras with flash.

The camera of FIG. 2 is operated as follows:

In the position which is shown in FIG. 2, the index 133 of the selector 131 registers with the symbol A of the median scale section 134b, i.e., the camera is set for operation in daylight and for automatic determination of exposure values as a function of the intensity of scene light. The multiple flash bulb holder 161 is disconnected from the socket 159 so that the return spring 158 is free to maintain the lug 167 of the slide 156 in abutment with the underside of the bearing 168. At the same time, a first locking arm 169 of a locking lever 171 extends into a cutout or recess 172 of the slide 156. The locking lever 171 is turnable on a fixed shaft 170 and is biased by a torsion spring 175 so that it tends to turn in a clockwise direction, as considered in FIG. 2. A second locking arm 173 of the lever 171 is then located inwardly of but does not extend into an internal channel 174 of the selector 131. The torsion spring 175 tends to move the first locking arm 169 substantially downwardly, i.e., in the same direction (arrow d) in which the spring 158 tends to move the slide 156.

If the index 133 is placed into registry with a graduation of the scale section 134a, the selector 131 places its internal stop surface 176 in front of the second locking arm 173 on the locking lever 171 so that the first locking arm 169 cannot be withdrawn from the recess 172 of the slide 156. In other words, the lever 171 is then fixed in the angular position shown in FIG. 2. However, when the selector 131 assumes the angular position shown in FIG. 2, the locking arm 173 can enter the channel 174, and such angular movement of the lever 171 can be effected by an inclined surface 172a bounding the recess 172 when the slide 156 is displaced (arrow d) in response to attachment of the multiple flash bulb holder 161 to the socket 159. Arrow a indicates in FIG. 2 the direction of angular movement of the locking lever 171 when the slide 156 is displaced by the plug 160 of the multiple flash bulb holder 161. This moves the second locking arm 173 into the channel 174 so that the selector 131 is arrested and cannot move its index 133 into registry with the scale section 134a or 134c as long as the holder 161 remains attached to the socket 159. This is a safety feature to prevent improper selection of exposure values when the camera is set for making exposure with light furnished by one of the flash bulbs 163.

In FIG. 2, the angular position of the output member 141a in the moving coil instrument 141 is a function of the intensity of scene light. The instrument 141 is connected in series with the resistor 140, light-sensitive receiver 139 and two-way switch 138. When the operator depresses the shutter release trigger, the aforementioned tracking mechanism detects the angular position of the output member 141a and the coupling member 110 changes the angular position of the outer ring 103 so that the size of the aperture defined by the blades 104 is also a function of the intensity of scene light. The direction in which the outer ring 103 can be displaced by the coupling member 110 is indicated by the arrow b. The lug 111 of the inner ring 102 remains in abutment with the stop 113.

When the coupling member 110 changes the angular position of the outer ring 103, the follower 116 of the control lever 117 tracks the cam 108 of the inner ring 102 and the spring 121 compels the levers 117, 120 to turn in a clockwise direction because the follower 116 moves off the crest of the cam 108. The spring 125 compels the retard lever 124 to turn in a counterclockwise direction and to place its post 130 into a position which corresponds to a predetermined exposure time. Thus, the exposure time is also determined as a function of the intensity of scene light.

If the operator thereupon decides to make an exposure with flash by resorting to the multiple flash bulb holder 161, the angular position of the selector 131 can remain unchanged, i.e., the index 133 can remain in registry with the symbol A on the median scale section 134b. As the operator pushes the plug 160 into the socket 159, the slide 156 is displaced against the opposition of the spring 158 (arrow d). The first locking arm 169 of the lever 171 is engaged by the inclined surface 172a so that the arm 169 is expelled from the recess 172 (arrow a) and the second locking arm 173 of the lever 171 penetrates into the channel 174 of the selector 131. This fixes the selector 131 in the illustrated position, i.e., the operator is unable to select an unsatisfactory light value.

As the slide 156 moves downwardly in response to insertion of the plug 160 into the socket 159, its lower end engages and displaces the pin 157 on the arm 155 so that the adjusting lever 120 turns in a clockwise direction (counter to that indicated by the arrow c) and moves its arm 120a away from the tongue 119 on the control lever 117. The spring 125 adjusts the angular position of the retard lever 124 so that a predetermined exposure time is set in a fully automatic way whenever the camera is used to make exposures with light furnished by a flash bulb 163.

The follower or arm 136 of the adjusting lever 120 causes the movable contact 138a of the switch 138 to engage the fixed contact 138c and to disconnect the light-sensitive receiver 139 and resistor 140 from the moving coil instrument 141. The latter is then connected in circuit with the battery 142, slider 146 and one, two or all three fixed resistors 143–145, depending on the angular position of the slider 146, i.e., on the distance from the subject. The slider 146 can be adjusted prior or subsequent to attachment of the multiple flash bulb holder 161. The output member 141a of the instrument 141 then assumes an angular position which is a function of the distance from the subject.

During depression of the shutter release trigger, the tracking mechanism detects the position of the output member 141a and the coupling member 110 changes the angular position of the outer ring 103 (arrow b) to select an appropriate aperture.

The aforementioned starting position of the inner ring 102 is indicative of the light value of the built-in flash unit. The ring 102 remains in such starting position (in which the lug 111 abuts against the stop 113) when the slide 156 is depressed against the opposition of the spring 158.

If the user thereupon decides to make exposures with another source of artificial light, the multiple flash bulb holder 161 is detached from the socket 159 so that the slide 156 returns to the upper end position of FIG. 2 in which the lug 167 abuts against the bearing 168. The other source of light (for example, an electronic flash unit) is then attached to the camera in a conventional way. The user also adjusts the angular position of the selector 131 so that the index 133 registers with a selected graduation on the scale section 134a. If the electronic flash unit has a light value of 22, angular movement of the index 133 into registry with the graduation 22 on the scale section 134a will cause no changes in the angular position of the ring 102, i.e., the leg 132 of the selector 131 will not reach the lug 111 of the inner ring 102 unless the index 133 is moved to the right and beyond the graduation 22 on the scale section 134a. However, the portion 135b of the operating cam on the selector 131 will engage the follower 136 so that the adjusting lever 120 turns in a clockwise direction and the retard lever 124 sets an exposure time which is appropriate for exposures with light furnished by the electronic flash unit. The follower 136 also moves the contact 138a into engagement with the fixed contact 138c so that the circuit of the moving coil instrument 141 is completed through the source 142, contacts 138a, 138c, slider 146 and one, two or three resistors 143–145.

If the light value of the electronic flash unit is less than 22 (see the scale section 134a), the leg 132 of the selector 131 will engage and displace the lug 111 of the inner ring 102 when the index moves into registry with the graduation 16 or 11 on the scale section 134a. The size of the aperture then depends on the angular position of the inner ring 102 and also on the angular position of the output member 141a.

When the index 133 registers with a graduation of the scale section 134a, the stop surface 176 of the selector 131 is outwardly adjacent to the second locking arm 173 of the lever 171 so that the first locking ram 169 cannot be withdrawn from the recess 172 and the slide 156 is locked in the illustrated upper end position. Thus, the operator cannot attach a multiple flash bulb holder 161 unless the index 133 is returned into registry with the symbol A on the median scale section 134b.

It is clear that the socket 159 can be designed to receive a single flash bulb at a time, or that this socket can be designed to receive multiple flash bulb holders which are different from the holder 161 of FIG. 2.

The camera of FIG. 2 differs from the camera of FIG. 1 in that it comprises a built-in flash unit (socket 159). When the built-in unit is placed in operative position by attaching the holder 161 to the socket 159, the camera is immediately ready to make exposures with light furnished by a bulb 163. This is achieved by the provision of the actauting member or slide 156 which sets the exposure time by acting upon the arm 155 of the adjusting lever 120 and which also causes the lever 120 to connect the median contact 138a of the switch 138 with the fixed contact 138c to disconnect the light-sensitive receiver 139 from the moving coil instrument 141. The angular position of the inner ring 102 which is not connected with the coupling member 110 then reflects the light value of the built-in flash unit, i.e., its lug 111 abuts against the stop 113. In the embodiment of FIG. 2, the light value of the built-in flash unit equals the maximum value on the scale section 134a.

Figure 3:
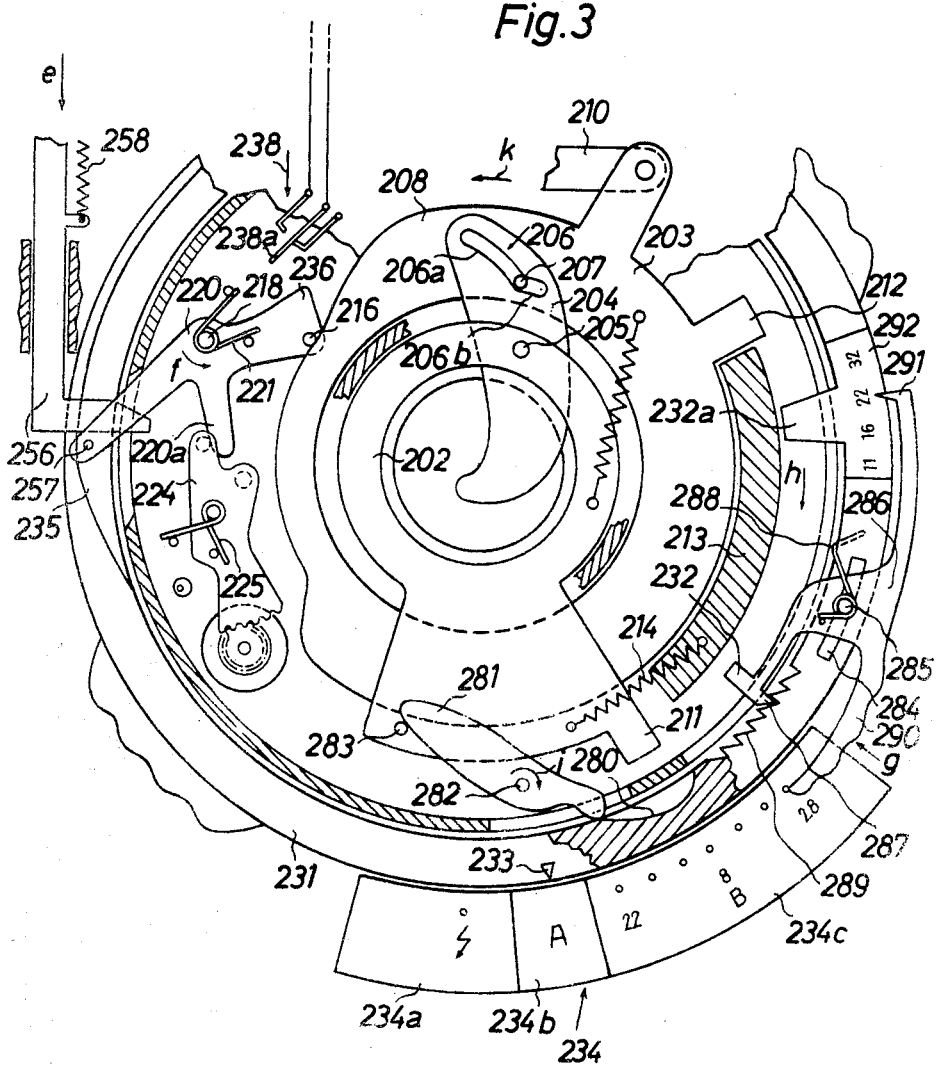
FIG. 3 is a fragmentary diagrammatic view of a camera which constitutes a modification of the camera shown in FIG. 2.

Referring now to FIG. 3, there is shown a portion of a camera which constitutes a modification of the just described camera. The main difference between the camera of FIGS. 2 and 3 is that the latter can be adjusted by hand to select guide numbers or light values which are greater than the guide number or light value of the built-in source of artificial illumination.

The camera of FIG. 3 again comprises a diaphragm with two rings 202, 203 and blades 204 (only one shown). Each blade 204 carries a pivot pin 205 which is turnably receiver in a bore of the inner ring 202 and each such blade is further provided with a composite slot 206 for the pin 207 of the outer ring 203. The outer ring 203 has a cam 208 which can be tracked by the follower pin 216 of an adjusting lever 220 replacing the levers 17, 20 or 117, 120. The lever 220 is turnable on a fixed shaft 218 and is biased by a torsion spring 221 which tends to turn it in a clockwise direction, as considered in FIG. 3. A motion receiving follower pin 257 of the adjusting lever 220 extends into the path of movement of an actuating member or slide 256 which corresponds to the slide 156 shown in FIG. 2. The slide 256 is biased by a return spring 258 and is depressible by a multiple flash bulb holder or by a single flash bulb (not shown) in the direction indicated by arrow e. The arm 220a of the adjusting lever 220 cooperates with a retard lever 224 which is biased by a torsion spring 225 and can determine the exposure time in the same way as described hereinbefore. The follower or arm 236 of the adjusting lever 220 carries the pin 216 and serves as a trip to move the contact 238a of a two-way switch 238 away from a first fixed contact and against a second fixed contact when the camera is to make exposures with artificial illumination of the subject. The remaining parts of the electric circuitry are constructed and assembled in the same way as described in connection with FIG. 2.

A composite selector means including an annular selector 231 is turnable about the optical axis and this selector 231 carries an index 233 which can be placed into registry with sections 234a, 234b, 234c of a fixed scale 234. The left-hand section 234a merely carries a thunderbolt symbol; the median section 234b carries a symbol A which indicates that the camera is set for operation in daylight; and the right-hand section 234c carries a series of graduations indicating different aperture sizes and a symbol B which indicates manual determination of such aperture sizes.

The selector 231 is further provided with an operating cam 235 which can engage the pin 257 of the adjusting lever 220, and with an internal cam 280 engaged by one arm of a two-armed intermediate lever 281 which is turnable on a fixed shaft 282 and the other arm of which engages with a pin 283 on the lug 211 of the inner ring 202. The outer ring 203 is provided with a lug 212 which is separated from the lug 211 by a fixed stop 213.

The selector 231 is further provided with an opening or slot 284 for the pin or shaft 285 of a rockable carrier 286 which constitutes a second component of the composite selector means. This carrier is provided with a motion transmitting portion or leg 232 and with a detent member or tooth 287 which can engage with a toothed or serated portion 289 of the annular selector 231. The carrier 286 is biased by a torsion spring 288 which operates in a sense to urge the tooth 287 against the serrated portion 289. A handgrip portion 290 of the carrier 286 can be depressed by hand (arrow g) to disengage the tooth 287 from the serrated portion 289, and the pin 285 is then shiftable in the slot 284 to place a pointer 291 of the carrier into registry with a selected graduation on a scale 292 of the annular selector 231. The graduations of the scale 292 indicate different light values.

The aforementioned composite slot 206 of the diaphragm blade 204 comprises a relatively short portion 206b and a relatively long portion 206a. In the illustrated position of the blade 204 shown in FIG. 3, the pin 207 of the outer ring 203 is located at the intersection of the slot portions 206a, 206b. The pin 207 will change the angular position of the blade 204 when it travels in the longer slot portion 206a but the portion 206b permits the outer ring 203 to turn about the optical axis without changing the angular position of the blade 204. Each other blade in the diaphragm of the camera shown in FIG. 3 is constructed and mounted in the same way as the blade 204.

The operation is as follows:

In the position which is illustrated in FIG. 3, the annular selector 231 is set to place the camera in condition for operation in daylight with automatic determination of exposure values. The index 233 registers with the symbol A. The angular position of the inner ring 202 is determined by the intermediate lever 281 which engages the internal cam 280 of the selector 231 and the pin 283 on the lug 211 of the inner ring 202. The pin 207 of the outer ring 203 is located at the junction of the portions 206a, 206b in the slot 206 of the blade 204. The intermediate lever 281 maintains the lug 211 of the inner ring 202 in a starting position at a predetermined distance from the fixed stop 213, i.e., the spring 214 is extended and tends to move the inner ring in a counterclockwise direction. The inner ring 202 can be moved from such starting position by turning in a clockwise or counterclockwise direction.

If the operator thereupon attaches a multiple flash bulb holder or a single flash bulb, the plug of the holder or the base of the bulb pushes the actuating member or slide 256 downwardly (arrow *e*) whereby the lower end portion of the slide turns the follower pin 257 of the adjusting lever 220 in the direction indicated by arrow *f*. The adjusting lever 220 changes the position of the movable contact 238*a* so that the switch 238 connects the moving coil instrument (not shown in FIG. 3) in circuit with a battery and with one or more fixed resistors corresponding to the resistors 143–145 of the variable resistor shown in FIG. 2. At the same time, the adjusting lever 220 changes the angular position of the retard lever 224 to set an appropriate exposure time for operation with light furnished by the flash bulb or by the holder which has caused displacement of the slide 256. The inner ring 202 remains in the illustrated starting position but the outer ring 203 turns in a counterclockwise direction (arrow *k*) when the operator depresses the release trigger, i.e., when the coupling member 210 receives motion from the tracking mechanism which detects the angular position of the output member in the moving coil instrument of the automatic exposure meter. Thus, the size of the aperture is selected as a function of guide number of the built-in flash unit and as a function of the distance from the subject.

If the user wishes to make exposures with another source of artificial light, for example, with an electronic flash unit which can be connected to the camera of FIG. 3, the handgrip portion 290 of the carrier 286 is depressed so that the pointer 291 of the carrier can be shifted to register with that graduation of the scale 292 on the annular selector 231 which corresponds to the light value of the electronic flash unit. The direction in which the handgrip portion 290 can be depressed is indicated by an arrow *g*, and such depression results in disengagement of the tooth 287 from the serrated portion 289 so that the pin 285 of the carrier 286 is radily shiftable in the slot 284 of the selector 231. The pin 285 can be shifted in or counter to the direction indicated by arrow *h*.

For example, and assuming that the pointer 291 of the carrier 286 has been placed into registry with the graduation 32 of the scale 292, the camera is ready to make an exposure with light furnished by the corresponding electronic flash unit as soon as the operator places the index 233 of the selector 231 into registry with the thunderbolt symbol on the scale section 234*a*. Since the intermediate lever 281 bears against the internal cam 280 of the selector 231 under the bias of the return spring 214 for the inner ring 202, the intermediate lever will turn in a clockwise direction (arrow *i*) when the selector 231 is turned clockwise to move the index 233 into registry with the thunderbolt symbol of the scale section 234*a*. Thus, the lug 211 of the inner ring 202 is free to turn in a counterclockwise direction (arrow *k*) until it reaches and abuts against the adjoining radial face of the fixed stop 213. The pin 207 of the outer ring 203 is then located in the rightmost region of the shorter slot portion 206*b*. During movement of the index 233 into registry with the symbol on the scale section 234*a*, the operating cam 235 causes the adjusting lever 220 to turn (arrow *f*) and to change the angular position of the retard lever 224 so that the latter sets an appropriate exposure time for operation with the electronic flash unit. Furthermore, the trip 236 of the adjusting lever 220 moves the contact 238*a* into engagement with that fixed contact of the switch 238 which connects the moving coil instrument with the battery and with one or more fixed resistors of the variable resistor through the intermediary of a slider corresponding to the member 146 shown in FIG. 2.

When the shutter release trigger is depressed, the coupling member 210 of the link train changes the angular position of the outer ring 203 (arrow *k*) to the extent determined by the angular position of the output member in the moving coil instrument. During the initial stage of such angular movement of the outer ring 203, the blades 204 do not change their positions because the pins 207 slide in the shorter slot portions 206*b* toward the junctions of shorter slot portions with the longer slot portions 206*a*. Such configuration of slots 206 in the blades 204 insures that the size of the aperture cannot be reduced below that which corresponds to placing of pins 207 at the junctions between the respective slot portions 206*a*, 206*b*. The pins 207 are located at such junctions if the carrier 286 is caused to move its pointer 291 into registry with another (smaller) graduation of the scale 292, i.e., if the motion transmitting leg 232 of the carrier is moved into engagement with the lug 211 and moves the latter away from the fixed stop 213.

It it is assumed that the built-in flash unit has a light value 22 (see the position of the pointer 291 in FIG. 3), the inner ring 202 will again assume the illustrated starting position if the pointer 291 remains in registry with the graduation 22 and the selector 231 is turned to place the index 233 into registry with the thunderbolt symbol on the scale section 234*a*. However, the inner ring 202 is then held in starting position by the leg 232 of the carrier 286, not by the intermediate lever 281. If the pointer 291 is placed into registry with a graduation other than 22 or 32 (for example, with the graduation 11 or 16), and if the pointer 233 is then placed into registry with the symbol on the scale section 234*a*, the leg 232 will move the lug 211 further away from the fixed stop 213 counter to the direction indicated by the arrow *k*.

The same result can be achieved if the inner ring 202 can be moved to an angular position in which the blades 204 are moved beyond positions corresponding to the maximum size of the aperture. In such cameras, the slots 206 need not be provided with mutually inclined portions. Furthermore, the leg 232 can be made as a separate part which is adjustable with reference to the selector 231, for example, in response to displacement of the carrier 286.

The motion transmitting leg 232*a* of the selector 231 will engage the lug 212 to turn the outer ring 203 in a counterclockwise direction when the index 233 is moved into registry with a graduation of the scale section 234*c*.

Referring finally to FIG. 4, there is shown a portion of a camera which constitutes a modification of the camera shown in FIG. 3. The diaphargm comprises concentric rings 302, 303 which are turnable about the optical axis of the objective lens 301 and can change the position of blades 304 (only one shown). The outer ring 303 has a cam 308 and is provided with an arm 309 which is coupled to one member 310 of a link train connecting it with the tracking mechanism for the output member 341*a* of the moving coil instrument 341. The rings 302, 303 are respectively provided with motion receiving lugs 311, 312 which flank a fixed stop 313 and are biased thereaginst by helical return springs 314, 315. The spring 314 is connected between the lug 311 and stop 313, and the spring 315 operates between the rings 302, 303.

The cam 308 of the outer ring 303 is tracked by a follower pin 316 provided on an arm 320*c* of an adjusting lever 320 which is turnable on a fixed shaft 318 and is biased by a torsion spring 321. A second arm 320*a* of the adjusting lever 320 is engaged by a post 322 of a retard lever 324 which is turnable on a shaft 323 and is biased by a torsion spring 325. The toothed segment 326 of the retard lever 324 meshes with a pinion 327 which is mounted on a shaft 329 and is connected with a flywheel or mass 328. The second post 330 of the retard lever 324 can set the exposure time in a manner as described in connection with FIG. 1.

The arm 320*c* of the adjusting lever 320 serves as a trip for the median contact 338*a* of a two-way switch 338 which further includes two fixed contacts 338*b*, 338*c*. The median contact 338*a* normally engages with the fixed contact 338*b* to connect the moving coil instrument 341 in circuit with a light-sensitive receiver 339 and a fixed resistor 340. When the trip 320*c* moves the median contact 338*a* into engagement with the fixed contact 338*c*, the switch 338 connects the moving coil instrument 341 with a battery 342, a slider 346 which is turnable by or in response to actuation of the focussing means, and with one, two or all three fixed resistors 343, 344, 345 through the intermediary of one of the arcuate conductors 347, 348, 349.

A third arm 320b of the adjusting lever 320 carries a motion receiving pin 357 which can be engaged by the lower end portion of a reciprocable actuating member or slide 356 biased by a return spring 358 and having an upper end portion which extends into the socket 359 of a built-in flash unit. The socket 359 is indexible and is provided with elastic terminals 364a, 364b which can be engaged by one pair of terminals 362a, 362b on the base of a multiple flash bulb holder 361 when the latter's plug 360 is introduced into and anchored in the socket 359. The terminals 364a, 364b are engaged by terminals 362a, 362b which are associated with that flash bulb 363 which is ready to be fired in response to closing of a synchronizing switch 366 which is connected with one or more sources 365 of electrical energy. The switch 366 can be closed by the shutter release trigger.

A composite selector means including an annular selector 331 is turnable about the optical axis and the selector 331 carries a motion transmitting leg 332a which can engage the lug 312 of the outer ring 303. An index 333 of the selector 331 can be placed into registry with sections 334a, 334b, 334c of a fixed scale 334. The lefthand section 334a carries a thunderbolt symbol; the median section 334b carries a symbol A; and the righthand section 334c carries a symbol B and series of graduations indicating different sizes of the aperture.

An operating cam 335 of the selector 331 can turn the adjusting lever 320 through the intermediary of the pin 357 on the arm 320b. The selector 331 is further provided with an elongated opening or slot 384 for the pin 385 of a rockable carrier 386 which constitutes an adjustable component of the composite selector means and is provided with a radially inwardly extending motion transmitting leg 332b and with a detent member or tooth 387. The carrier 386 is biased by a torsion spring 388 which tends to maintain the tooth 387 in engagement with a serrated portion 389 of the selector 331. A handgrip portion 390 of the carrier 386 may be depressed in the direction indicated by arrow a in order to disengage the tooth 387 from the serrated portion 389 and to enable the pin 385 to move in the slot 384 in order to place a pointer 391 of the carrier into registry with a desired graduation on the scale 392 of the selector 331. The graduations on the scale 392 indicate different light values.

If the camera is to be used with a built-in flash unit (socket 359 and multiple flash bulb holder 361) and with a second flash unit (for example, an electronic flash unit), and if the user wishes to make exposures with light furnished by the second flash unit, the operator must shift the carrier 386 with reference to the selector 331 so as to place the pointer 391 into registry with that graduation of the scale 392 which represents the light value of the electronic flash unit. As stated before, such shifting of the carrier 386 is possible upon depression of the handgrip portion 390 (arrow a) and upon resulting disengagement of the tooth 387 from the serrated portion 389. The pin 385 is then shiftable in and counter to the direction indicated by the arrow b.

The operator thereupon turns the selector 331 to place the index 333 into registry with the thunderbolt symbol on the scale section 334a. During such turning of the selector 331, the motion transmitting leg 332b of the carrier 386 engages the lug 311 and turns the inner ring 302 in a clockwise direction (arrow c). The operating cam 335 of the selector 331 engages the pin 357 and turns the adjusting lever 320 in a counterclockwise direction (arrow d) so that the spring 325 can change the angular position of the retard lever 324 (arrow e) in order to set an exposure time which is appropriate for operation with electronic flash. The arm 320c of the adjusting lever 320 moves the median contact 338a of the switch 338 into engagement with the fixed contact 338c so that the moving coil instrument 341 is disconnected from the light-sensitive receiver 339 but is connected with the battery 342, slider 346 and one, two or all three resistors 343–345.

When the shutter release trigger is depressed, the aforementioned tracking mechanism detects the angular position of the output member 341a in the moving coil instrument 341 and the coupling member 310 turns the outer ring 303 through a certain angle (in a direction counter to that indicated by the arrow c) and effects a final determination of the aperture size. Preliminary determination was made by the iner ring 302 which has been displaced by the motion transmitting leg 332b of the carrier 386. In other words, the size of the aperture is a function of the light value of the electronic flash unit and a function of the distance from the subject (depending on the angular position of the output member 341a which in turn depends upon the number of resistors 343–345 which are connected in circuit with the moving coil instrument 341).

If the index 333 of the selector 331 is in registry with the section 334b or 334c of the scale 334, the multiple flash bulb holder 361 can be attached to the socket 359 whereby the camera is automatically set for operation with the built-in flash unit. The slide 356 then acts upon the pin 357 and changes the angular position of the adjusting lever 320 so that the latter can move the contact 338a into engagement with the contact 338c and adjusts the angular position of the retard lever 324 to set the shutter for an exposure time which is best suited for operation with light furnished by a bulb 363.

The camera of FIG. 4 can be modified in a number of ways. For example, this camera need not be provided with a built-in flash unit or the slide 356 can be omitted so that attachment of the holder 361 or of a single flash bulb to the socket 359 will not effect automatic setting of the exposure time and/or auomatic disconnection of the light-sensitive receiver 339 from the moving coil instrument 341.

An advantage of the cameras shown in FIGS. 3 and 4 is that the operator can make exposures in daylight or with the built-in flash unit without necessitating any adjustments in the position of the angular selector 231 or 331. Thus, the index 233 or 333 can remain in registry with the scale section 234b or 334b when the multiple flash bulb holder or a flash bulb is attached or detached from the built-in socket. Furthermore, and referring to FIG. 4, the position of the carrier 386 can remain unchanged when the user decides to make an exposure in daylight or with light furnished by the multiple flash bulb holder 361 following an exposure with the electronic flash unit. Furthermore, and to switch from exposures in daylight to exposure with a certain electronic flash unit, the user merely turns the selector 331 to move the index 333 from registry with the symbol A into registry with the thunderbolt symbol on the scale section 334a.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a photographic camera for use with built-in or detachable sources of artificial light, a combination comprising a diaphragm including a pair of setting members each movable with reference to the other to provide a range of aperture sizes, and blade means connected to and movable by each of said setting members; an exposure meter including an output member movable to a plurality of positions, light-sensitive means connectable with said output member to determine the latter's position as a function of the intensity of scene light, variable resistor means connectable with said output member to determine the latter's position as a function of the distance from the subject, an assembly for changing the position of one of said setting members as a function of the position of said output member, and a switchover device actuatable to selectively connect said output member with one of said means; and manually actuatable selector means for moving the other setting member to at least one position which is a function of a characteristic of a source of artificial light.

2. A combination as defined in claim 1, wherein said characteristic is the guide number or the light value of the source.

3. A combination as defined in claim 1, wherein said selector means comprises means for actuating said switchover means.

4. A combination as defined in claim 3, wherein said switchover means comprises a two-way electric switch and said actuating means comprises a cam on said selector means.

5. A combination as defined in claim 1, further comprising adjustable shutter regulating means operative to furnish a plurality of exposure times, and operating means associated with said selector means and arranged to operate said regulating means on actuation of said selector means to provide an appropriate exposure time in response to displacement of the other setting member by said selector means.

6. A combination as defined in claim 5, wherein said regulating means comprises adjustable retard means and a movable adjusting member for said retard means, said operating means comprising a cam having a first portion which engages and moves said adjusting member in response to movement of said selector means to at least one first position, and a second portion which is disengaged from said adjusting member in at least one second position of said selector means.

7. A combination as defined in claim 6, wherein said one setting member and said operating means comprise means for moving said adjusting member to effect adjustment of said retard means in response to movement of said one setting member.

8. A combination as defined in claim 7, wherein the means for moving said adjusting member comprises a movable control member and said one setting member comprises a cam which engages with said control member.

9. A combination as defined in claim 1, wherein said selector means comprises motion transmitting means for moving said one setting member to effect manual determination of the aperture size.

10. A combiantion as defined in claim 1, wherein at least one of said setting members comprises a projection and said selector means comprises a motion transmitting portion engageable with said projection to move the respective setting member.

11. A combiantion as defined in claim 1, wherein said variable resistor means comprises a plurality of fixed resistors and conductor means movable to a plurality of positions in each of which it connects a different number of fixed resistors with said output member in the corresponding position of said switchover means, said positions of the conductor means corresponding to different distances between the camera and the subject.

12. A combination as defined in claim 1, wherein said selector means comprises a selector movable to and from a predeterminated position in which the camera is set for operation in artificial light and a motion transmitting portion adjustably supported by said selector, said other setting member comprising a motion receiving portion which is moved by said motion transmitting portion in response to adjustment of said motion transmitting portion in said predetermined position of the selector.

13. A combination as defined in claim 12, wherein said selector means further comprises a carrier which is adjustable with reference to said selector and is rigid with said motion transmitting portion.

14. A combination as defined in claim 12, wherein said selector comprises a second motion transmitting portion which is movable into engagement with a portion of said one setting member to change the aperture size at the will of the operator.

15. In a photographic camera, a combination comprising a built-in source of artificial light movable between operative and inoperative positions; a diaphragm including a pair of setting members movable with reference to each other to provide a range of aperture sizes; an exposure meter including an output member movable to a plurality of positions, light-sensitive means connectable with said output member to determine the latter's position as a function of the intensity of scene light, variable resistor means connectable with said output member to determine the latter's position as a function of the distance from the subject, an assembly for changing the position of one of said setting members as a function of the position of said output member, and a switchover device actuatable to selectively connect said output member with one of said means; manually actuatable selector means for moving the other setting member to at least one position which is a function of a characteristic of a source of artificial light; adjustable shutter regulating means operative to furnish a plurality of exposure times; operating means associated with said selector means to operate said regulating means on actaution of said selector means to provide at least one first exposure time in response to displacement of the other setting member by said selector means; actuating means for adjusting said regulating means to furnish a second exposure time in response to movement of said built-in source to operative position; and means provided on said one setting member to adjust said regulating means in response to displacement of said one setting member by said assembly.

16. A combination as defined in claim 15, wherein said other setting member is movable to and from a starting position in which said other setting member remains when said built-in source is moved to operative position.

17. A combination as defined in claim 16, wherein said regulating means comprises a movable adjusting member which is engageable by said actuating means and comprises a portion which actuates said switchover means to connect said output member with said variable resistor means in response to movement of said built-in source to operative position.

18. A combination as defined in claim 16, wherein said starting position of the other setting member is indicative of the light value of the built-in source of artificial light.

19. A combination as defined in claim 18, wherein said other setting member is movable to a plurality of positions each of which corresponds to a series of light values of sources of artificial light other than said built-in source, and wherein the light value of said built-in source corresponds to the maximum light value of said series so that said starting position coincides with the position which said other setting member assumes as a function of the maximum light value of said series.

20. A combination as defined in claim 16, further comprising an intermediate member arranged to maintain said other setting member in starting position when said output member is connected with said light sensitive means.

21. A combination as defined in claim 20, wherein said starting position of said other setting member reflects the light value of said built-in source.

22. A combination as defined in claim 20, wherein said intermediate member is movable by said selector means to effect a change in the position of said other setting member in response to actuation of said selector means.

23. A combination as defined in claim 22, wherein said other setting member is movable in two different directions from said starting position thereof and wherein movement of said other setting member in one of said directions effects no changes in the effective size of the aperture.

24. A combination as defined in claim 23, wherein said diaphragm further comprises blade means coupled with said setting members and wherein said blade means moves beyond a position corresponding to a maximum aperture size in response to movement of the other setting member in said one direction.

25. A combination as defined in claim 15, wherein said shutter regulating means comprises an adjusting member which is movable by said one setting member and by said actuating means.

26. A combination as defined in claim 25, wherein said adjusting member is further movable by said operating means.

27. A combination as defined in claim 15, further comprising locking means movable between a first position of blocking engagement with said selector means when said built-in source is moved to operative position and a second position of blocking engagement with said actuating means in the inoperative position of said built-in source.

28. A combination as defined in claim 27, wherein said selector means is movable to and from a position in which said switchover means connects said output member with said light-sensitive means and in which said built-in source is free to move to operative position to thereby effect actuation of said switchover means so that said output member is then connected with said variable resistor means in unchanged position of said selector means.

29. A combination as defined in claim 28, wherein said locking means comprises a lever turnable about a fixed axis and having a first portion received in a recess of said actuating means in the first position of said locking means and a second portion receivable in a channel of said selector means in the second position of said locking means.

30. A combination as defined in claim 29, wherein said selector means further comprises a stop portion for preventing movement of said locking means to first position when said selector means assumes a position in which the position of said other setting member is a function of a characteristic of a source other than said built-in source.

31. A combination as defined in claim 27, further comprising means for biasing the locking means to one of said positions thereof.

32. A combination as defined in claim 15, wherein said built-in source comprises a socket and said actuating means comprises a portion which extends into said socket in the inoperative position of said source, and means for biasing said portion of the actuating means into said socket.

33. A combination as defined in claim 32, wherein said actuating means comprises a reciprocable slide.

34. In a photographic camera for use with built-in or detachable sources of artificial light, a combination comprising a diaphragm including a pair of setting members movable with reference to each other to provide a range of aperture sizes; an exposure meter including an output member movable to a plurality of positions, light-sensitive means connectable with said output member to determine the latter's position as a function of the intensity of scene light, variable resistor means connectable with said output member to determine the latter's position as a function of the distance from the subject, and assembly for changing the position of one of said setting members as a function of the position of said output member, and a switchover device actuatable to selectively connect said output member with one of said means; manually actuatable selector means for moving the other setting member to at least one position which is a function of a characteristic of a source of artificial light, said selector means comprising a selector movable to and from a predetermined position in which the camera is set for operation in artificial light, a motion transmitting portion adjustably supported by said selector and a carrier adjustable with reference to said selector and rigid with said motion transmitting portion, said other setting member comprising a motion receiving portion which is moved by said motion transmitting portion in response to adjustment of said motion transmitting portion in said predetermined position of the selector; and detent means for releasably securing said carrier to said selector.

35. A combination as defined in claim 34, wherein said carrier is coupled to said selector by a pin-and-slot connection and wherein said detent means comprises a tooth provided on said carrier, a serrated portion provided on said selector, and means for biasing said tooth into engagement with said serrated portion.

36. On a photographic camera for use with built-in and detachable sources of artificial light, a combination comprising a diaphragm including a pair of setting members movable with reference to each other to provide a range of aperture sizes; an exposure meter including an output member movable to a plurality of positions, light-sensitive means connectable with said output member to determine the latter's position as a function of the intensity of scene light, variable resistor means connectable with said output member to determine the latter's position as a function of the distance from the subject, an assembly for changing the position of one of said setting members as a function of the position of said output member, and a switchover device actuatable to selectively connect said output member with one of said means; manually actuatable selector means for moving the other setting member to at least one position which is a function of a characteristic of a source of artificial light, said selector means comprising a selector movable to and from a predetermined position in which the camera is set for operation in artificial light, a motion transmitting portion adjustably supported by said selector, and a scale having graduations indicative of characteristics of different sources of artificial light, said other setting member comprising a motion receiving portion which is moved by said motion transmitting portion in response to adjustment of said motion transmitting portion in said predetermined position of the selector; and a pointer rigid with said motion transmitting portion and adatped to be placed into registry with selected graduations of said scale.

37. In a photographic camera for use with built-in or detachable sources of artificial light, a combination comprising a diaphragm including a pair of setting members movable with reference to each other to provide a range of aperture sizes, each of said setting members comprising a ring; an exposure meter including an output member movable to a plurality of positions, light-sensitive means connectable with said output member to determine the latter's position as a function of the intensity of scene light, variable resistor means connectable with said output member to determine the latter's position as a function of the distance from the subject, an assembly for changing the position of one of said setting members as a function of the position of said output member, and a switchover device actuatable to selectively connect said output member with one of said means; manually actuatable selector means for moving the other setting member to at least one position which is a function of a characteristic of a source of artificial light, said selector means comprising an annulus which is concentric with said rings; a fixed scale adjacent to said annulus; and an index on said annulus said index being movable into registry with different sections of said scale to respectively indicate different settings of the camera.

(References on following page)

References Cited

UNITED STATES PATENTS

| | | |
|---|---|---|
| 3,037,439 | 6/1962 | Rentschler _____ 95—11.5 XR |
| 3,072,028 | 1/1963 | Lange. |
| 3,118,356 | 1/1964 | Sauer et al. |

NORTON ANSHER, Primary Examiner

J. F. PETERS, Jr., Assistant Examiner

U.S. Cl. X.R.

95—64